United States Patent [19]

Yamamoto et al.

[11] 4,154,322

[45] May 15, 1979

[54] SQUEAL PREVENTING DISC BRAKE PAD ASSEMBLY

[75] Inventors: Masachika Yamamoto; Yoshiyuki Terai, both of Itami, Japan

[73] Assignee: Sumitomo Electric Industries, Ltd., Osaka, Japan

[21] Appl. No.: 817,299

[22] Filed: Jul. 20, 1977

[30] Foreign Application Priority Data

Oct. 25, 1976 [JP] Japan ............................ 51-143822[U]

[51] Int. Cl.² ............................................. F16D 65/00
[52] U.S. Cl. ................................. 188/73.5; 188/250 B
[58] Field of Search ................. 188/73.5, 73.1, 250 B, 188/250 G, 264 B, 205 A, 1 B, 71.1, 72.4

[56] References Cited

U.S. PATENT DOCUMENTS

| 3,477,551 | 11/1969 | Beuchle et al. | 188/250 B |
| 3,684,061 | 8/1972 | Ogawa et al. | 188/73.5 |
| 3,848,708 | 11/1974 | Noguchi | 188/73.5 |

FOREIGN PATENT DOCUMENTS

| 2058045 | 7/1971 | Fed. Rep. of Germany | 188/73.5 |
| 2602798 | 7/1976 | Fed. Rep. of Germany | 188/73.5 |

*Primary Examiner*—Edward R. Kazenske
*Attorney, Agent, or Firm*—Sughrue, Rothwell, Mion, Zinn and Macpeak

[57] ABSTRACT

A disc brake pad assembly includes a wire mesh screen 6 between the friction pad backing plate 3 and a shim 5 to reduce squeal when the brake piston 10 applies pressure to the backing plate to urge the friction pad 2 against the disc 1. The squeal suppression may be enhanced by applying a lubricant to the wire mesh screen.

4 Claims, 2 Drawing Figures

SQUEAL PREVENTING DISC BRAKE PAD ASSEMBLY

BACKGROUND OF THE INVENTION

1. Field of the Invention

This invention relates to a squeal preventing disc brake pad assembly.

2. Description of the Prior Art

Squeal has been a plaguing problem in disc design, and is generally caused by the brake pads intermittently grabbing and skipping over the sliding surface of the disc.

To prevent such squeal, a thin, asymmetrically configured shim has been inserted between the friction pad backing plate and the face of the hydraulic actuating piston to push the friction pad against the disc, as taught in U.S. Pat. No. 3,113,643. Such a device, while certainly helpful, has not been found to be completely effective.

SUMMARY OF THE INVENTION

An object of the present invention is thus to overcome this deficiency of the prior art by providing, in a disc brake pad assembly, a wire mesh screen between the friction pad backing plate and the shim to eliminate squeal when the brake actuation device applies pressue to the shim to urge the friction pad against the disc. The squeal supression may be further enhanced by applying a lubricant to the wire mesh screen.

DETAILED DESCRIPTION OF THE PREFERRED EMBODIMENT

Figure 1:
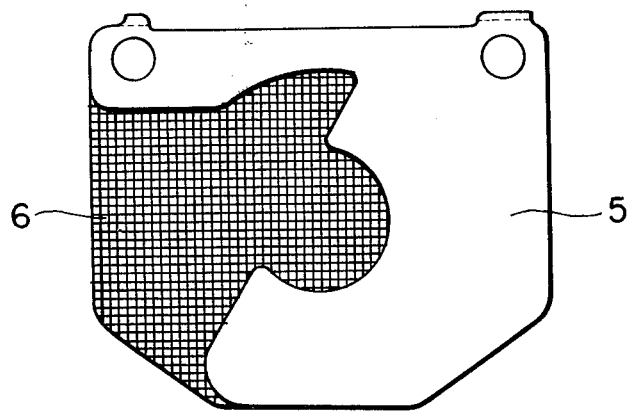
FIG. 1 shows a front view, in simplified schematic form, of a disc brake pad assembly according to a preferred embodiment of the present invention, as seen from the pressing device side of the pad assembly.
Figure 2:
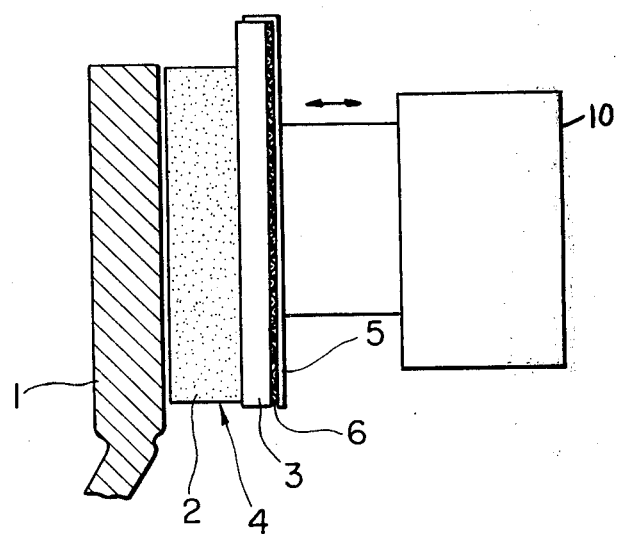
FIG. 2 shows a cross-sectional view of the pad assembly as seen from the left side in FIG. 1. (The disc 1 is presented so as to enable the present invention to be more easily understood.)

Referring now to the drawings, a disc brake pad assembly 4 according to the present invention includes a friction pad 2, a backing plate 3 to which the friction pad lining is mounted, a conventional thin, asymmetrical shim 5, and a wire mesh screen 6 interposed between the shim 5 and the backing plate 3. The pad assembly is adapted to be urged against the surface of rotating disc 1 by a pressing device such as a hydraulic actuating piston 10 disposed closely adjacent the surface of the shim 5 proximate the center of the pad assembly.

The asymmetrical shim 5 has a configuration as shown in FIG. 1, and is preferably stamped out from a non-corrosive steel plate approximately 0.3 mm thick.

The wire screen 6 used in test embodiments of the invention included mesh sizes #s 40, 50 and 200 (Japanese Industrial Standard), wherein the higher the number the smaller the mesh opening size. All of the screens were found to perform satisfactorily, even those having the relative small mesh openings. Stainless steel screens are more preferable than iron screens since, while more costly than the latter, they avoid rust and corrosion problems and implement smoother sliding movement with the shim 5 because their hardness is greater than that of iron.

In operation, the face of the pressing device 10 such as a piston directly engages the shim 5, and the force applied thereby is transferred to the friction pad 2 through the wire screen 6 and backing plate 3. The configuration of the asymmetrical shim 5 has the effect of shifting the pressure application center to the lower right in FIG. 1, and the plate also serves to more widely distribute the piston pressure over the surface of the wire screen to thereby prevent the crushing or flattening of the screen mesh. That is, if the wire screen 6 is mounted on the outside of the shim 5 and is directly engaged by the face of the actuating piston, there is a tendency to crush the screen mesh where it contacts the piston and thereby this reduces its effectiveness.

The exact principles of operation of the invention have not been clearly established, although it is assumed that the wire screen provides a certain degree of elasticity and flexibility to the pad assembly which serves to dampen and absorb any vibrational chattering and squeal that would otherwise develop during brake application. The interposition of the wire screen also provides an added degree of lubricity to the assembly, and implements smoother relative movement between the load shifting plate 5 and the backing plate 3. It has been found, for example, that the squeal suppression and damping effects of the invention are enhanced when a lubricating grease is applied to the wire screen.

What is claimed is:

1. In a disc brake pad assembly including a friction pad mounted on a backing plate and a thin, non-corrosive, shim asymmetrically disposed over the backing plate and adapted to be engaged by a pressing device to urge the friction pad against a rotating disc, the improvement characterized by:
    a compressible wire mesh screen interposed between the backing plate and the shim.

2. A disc brake pad assembly as defined in claim 1, wherein the wire mesh screen is made of a non-corrosive metal.

3. A disc brake pad assembly as defined in claim 1, wherein a lubricating grease is applied to the screen.

4. A disc brake pad assembly as defined in claim 2, wherein a lubricating grease is applied to the screen.